J. L. CASE.
POWER BELT.
APPLICATION FILED APR. 24, 1918.
1,300,345.
Patented Apr. 15, 1919.
Fig. 1.
Fig. 2.
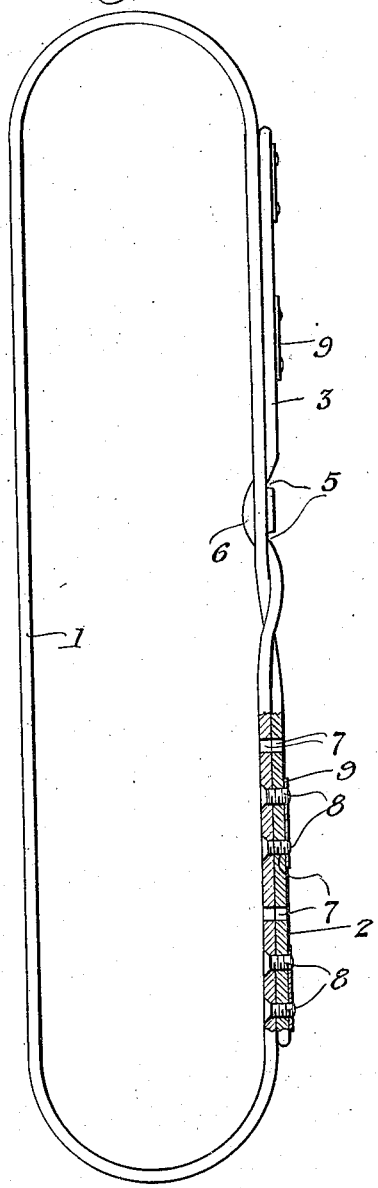
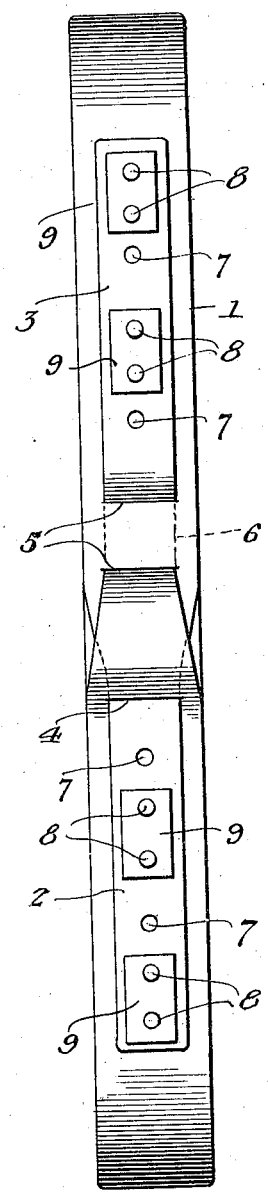
Witness
J. H. Parnell
Inventor
John L. Case,
By Victor J. Evans
Attorney

UNITED STATES PATENT OFFICE.

JOHN L. CASE, OF SUNNYSIDE, WASHINGTON.

POWER-BELT.

1,300,345.  Specification of Letters Patent.  Patented Apr. 15, 1919.

Application filed April 24, 1918. Serial No. 230,526.

*To all whom it may concern:*

Be it known that I, JOHN L. CASE, a citizen of the United States, residing at Sunnyside, in the county of Yakima and State of Washington, have invented new and useful Improvements in Power-Belts, of which the following is a specification.

This invention relates to improvements in power belts, especially the belts used for driving the rotary fans of automobiles, the object of the invention being to provide an improved power belt which can be readily tightened when required and the ends of which are securely fastened so that the belt is thoroughly efficient in use.

With the above and other objects in view, the invention consists in the construction, combination and arrangement of devices hereinafter described and claimed.

In the accompanying drawing:—

Figure 1 is an elevation partly in section of a power belt constructed and arranged in accordance with my invention.

Fig. 2 is a plan of the same.

The belt 1, in accordance with my invention, is provided with narrowed end extensions 2, 3. That portion of the belt adjacent the extension 2 is provided with a transverse slot 4 through which the extension 3 is passed so that said extension 3 is arranged on the outer side of the belt. That portion of the belt at the inner end of the extension 3 is provided with a pair of spaced transverse slots 5 through which the extension 2 is passed first inwardly and then outwardly as at 6, so that said extension 2 is also arranged on the outer side of the belt and the ends of the belt are connected together in overlapping relation and slidably.

The end extensions and the underlying portions of the belt are provided with adjusting openings 7. Suitable fastening means are inserted in certain of the adjusting openings to secure the ends of the belt and permit the adjustment of the belt to enable the same to be tightened or loosened as may be required. The fastening means are here shown as screws 8 which pass through said openings and which are arranged with engaged heads at their inner ends which are countersunk in the inner side of the belt, the threaded outer portions of the screws engaging threaded openings in plates 9 which bear on the outer sides of the end extensions.

My improved power belt is very simple in construction and durable, is not likely to become disconnected at the ends, and may be adjusted to tighten or loosen the same as required.

While I have herein shown and described a preferred embodiment of my invention, I would have it understood that changes may be made in the form, proportion and construction of the several parts, without departing from the spirit of my invention, and within the scope of the appended claims.

Having thus described the invention, what is claimed as new is:

1. A power belt of the class described, having narrowed end extensions and provided near the inner end of one end extension with a transverse slot to receive the other end extension and also provided near the last named extension with a pair of transverse slots to receive the first named end extension so that the end extensions are arranged in overlapping relation on or at the outer side of the belt, and fastening means to secure the end extensions on the belt.

2. A power belt of the class described, having narrowed end extensions and provided near the inner end of one end extension with a transverse slot to receive the other end extension and also provided near the last named extension with a pair of transverse slots to receive the first named end extension so that the end extensions are arranged in overlapping relation on or at the outer side of the belt, and fastening means to secure the end extensions on the belt, said end extensions and the corresponding portions of the belt being provided with a series of adjusting openings, and said fastening means extending through certain of said openings.

3. A power belt of the class described, having narrowed end extensions and provided near the inner end of one end extension with a transverse slot to receive the other end extension and also provided near the last named extension with a pair of transverse slots to receive the first named end extension so that the end extensions are arranged in overlapping relation on or at the outer side of the belt, fastening means to secure the end extensions on the belt, said end extensions and the corresponding portions of the belt being provided with a series of adjusting openings, and said fastening means extending through certain of said openings and comprising screws having heads at their inner ends engaging the inner side of the belt and plates on the outer sides of the end extensions and having threaded openings engaged by the screws.

In testimony whereof I affix my signature.

JOHN L. CASE.

Copies of this patent may be obtained for five cents each, by addressing the "Commissioner of Patents, Washington, D. C."